March 23, 1926.
J. McDONALD
1,577,749
COMMUTATOR BRUSH MOUNTING
Filed March 14, 1924
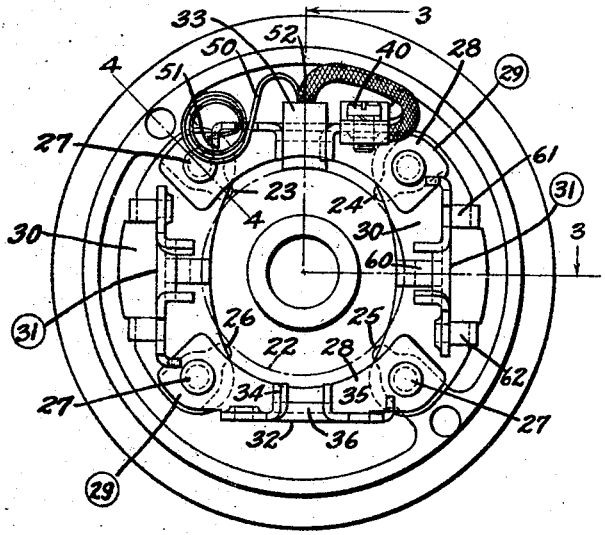
Fig. 1
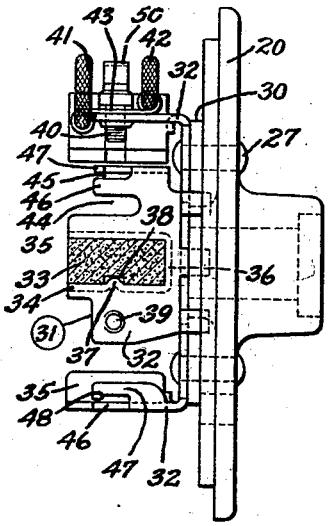
Fig. 2
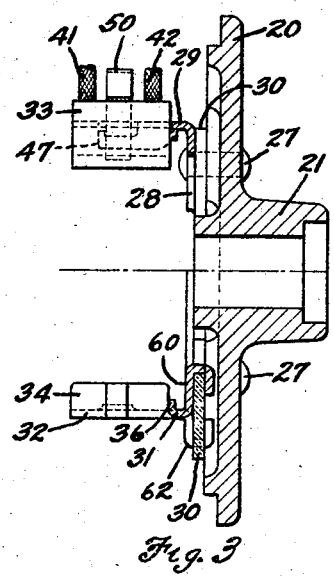
Fig. 3
Fig. 4
Inventor
Jerry McDonald
By Spencer, Sewall and Hardman
his Attorneys Patented Mar. 23, 1926.

1,577,749

UNITED STATES PATENT OFFICE.

JERRY McDONALD, OF DAYTON, OHIO, ASSIGNOR TO THE DAYTON ENGINEERING LABORATORIES COMPANY, OF DAYTON, OHIO, A CORPORATION OF OHIO.

COMMUTATOR-BRUSH MOUNTING.

Application filed March 14, 1924. Serial No. 699,162.

*To all whom it may concern:*

Be it known that I, JERRY McDONALD, a citizen of the United States of America, residing at Dayton, county of Montgomery, and State of Ohio, have invented certain new and useful Improvements in Commutator-Brush Mountings, of which the following is a full, clear, and exact description.

This invention relates to brush rigging for dynamo electric machines, and includes among its objects to reduce the number of parts in order to simplify the construction and reduce the cost of manufacture.

Further objects and advantages of the present invention will be apparent from the following description, reference being had to the accompanying drawings, wherein a preferred form of embodiment of the present invention is clearly shown.

In the drawings:

Fig. 1 is an end view of a starting motor end frame provided with a form of the present invention.

Fig. 2 is a side view thereof.

Figs. 3 and 4 are sectional views taken on the line 3—3 and 4—4 of Fig. 1.

Referring to the drawings, 20 designates an end frame for dynamo electric machine such as for an electric motor of a type generally comprising a cylindrical field frame attached in any suitable manner to end frames which provide bearings for the motor shaft. The end frame 20 includes a bearing 21; and, upon the side of the frame 20 which is located adjacent the commutator of the motor indicated by the dot and dash line circle 22, the frame 20 is provided with a plurality of equi-angularly spaced bosses 23, 24, 25 and 26 each provided with an aperture for receiving a rivet 27, preferably of copper. Each rivet 27 passes through an aperture in the base portion 28 of a brush bracket 29 and through an aperture in a non-conducting block 30 which serves as a mounting base for one of the brush brackets 31.

The brush brackets 29 and 31 are provided with similar brush receiving portions 32 extending at right angles to the side of the end frame 20. Each portion 32 is provided with a notch for receiving a brush 33, this notch being surrounded by flanges 34, 35 and 36 which serve to guide the brush as it is resiliently pressed toward the commutator (see Fig. 2). Sidewise motion of the brush is limited in one direction by the flange 36 and in the other by a ridge 37 projecting from the flange 34 into a notch 38 provided in the brush 33. Each portion 32 is provided with a tapped hole 39 for receiving a screw 40 for attaching the brush terminals 41 and 42, and brush terminal clip 43 to the portion 32. The two insulated brushes are of course connected in parallel by a wire (not shown) which may be secured to the two insulated brackets 31 by these terminal screws 40. Also the insulated conductor (not shown) which leads the current to the motor armature may be secured to one of the insulated brackets 31 by the terminal screw 40 as is obvious from the drawings. Each brush receiving portion 32 is provided with notches 44 and 45 providing spaced lugs 46 and 47. The material is bent so that the lug 47 is at right angles from the lug 46. The lug 47 is wider at its free end portion than where it joins the rest of the material so as to provide a shoulder 48 (see Fig. 2) which tends to prevent in one direction the endwise movement of a coil spring 50 having one end 51 engaging the notch 45 and resting upon the lug 47. The convolutions of the spring 50 are received by the notch 44 and the other end 52 of the spring bears against the outer end of the brush 33 (see Fig. 1).

In order that the brush brackets 31 may be insulated from the end frame 20 they are mounted upon the insulating blocks 30. The brush supporting portion of bracket 31 is provided with lugs 60, 61, and 62 which extend first at right angles from the brush supporting portion and are received by notches provided in the non-conducting blocks 30. These lugs are bent around the notches and terminate along the inside surface of the non-conducting blocks 30 as clearly shown in Figs. 1 and 3.

Only four rivets 27 are required to secure all four of the brush brackets to the end frame, and these rivets provide ground connections for the two brush brackets 29 which are in the grounded circuit. Since the holes for the rivets 27 are equally spaced, the brush brackets may be assembled in different relations with respect to the end frame.

Therefore if it is desired to cause a direction of rotation of the motor opposite to that caused by the brush assembly shown in Fig. 1, it is only necessary to assemble the brush brackets 29 where the insulating blocks 30 are now shown and, of course, place the insulating blocks 30 with the brush brackets 31 mounted thereupon where the brackets 29 are now shown in Fig. 1. It will be obvious that this mutual interchange of position of the grounded brushes held by brackets 29 and the insulated brushes held by brackets 31 means simply that all the brushes are rotated through an angle of 90° with respect to the four field poles of the motor, which of course will cause a reversal of direction of rotation of the motor if the direction of current in the field windings remains the same.

While the form of embodiment of the present invention as herein disclosed, constitutes a preferred form, it is to be understood that other forms might be adopted, all coming within the scope of the claims which follow.

What is claimed is as follows:

1. In an electric dynamo having a stationary frame and four commutator brushes mounted thereupon, in combination, four supporting brackets for said brushes arranged about the axis of rotation of the dynamo and having their end portions mutually overlapping, and securing means passing through said overlapping end portions for securing said brackets to the stationary frame, two of said brackets being grounded to said frame through said securing means.

2. In an electric dynamo having a stationary frame and four commutator brushes mounted thereupon, in combination, four supporting brackets for said brushes arranged about the axis of rotation of the dynamo, each bracket having portions mutually overlapping the two adjacent brackets, and securing means passing through said overlapping portions for securing said brackets to the stationary frame, two of said brackets being insulated from said securing means.

3. In an electric dynamo having a stationary frame and four commutator brushes mounted thereupon, in combination, four supporting brackets for said brushes arranged about the axis of rotation of the dynamo, each bracket having portions mutually overlapping the two adjacent brackets, and securing means passing through said overlapping portions for securing said brackets to the stationary frame, two of said brackets being grounded to said frame through said securing means, and the other two of said brackets being insulated from said securing means.

4. In an electric dynamo having a stationary frame and a plurality of commutator brushes mounted thereupon, in combination, a plurality of supporting brackets for said brushes each bracket being in electrical contact with the brush supported thereby, and a plurality of securing means each securing two adjacent brackets to said stationary frame, each alternate bracket being insulated from its securing means.

5. In an electric dynamo having a stationary frame and a plurality of commutator brushes mounted thereupon in combination, a plurality of supporting brackets for said brushes each bracket being in electrical contact with the brush supported thereby, and a plurality of securing means each securing two adjacent brackets to said stationary frame, each alternate bracket being insulated from its securing means, and the remaining brackets being grounded to said frame through said securing means.

In testimony whereof I hereto affix my signature.

JERRY McDONALD.